United States Patent [19]

Satoh et al.

[11] Patent Number: 5,060,972
[45] Date of Patent: Oct. 29, 1991

[54] AIR BAG SYSTEM

[75] Inventors: Takeshi Satoh; Yoshikazu Nakayama; Masami Sawada; Takayasu Zushi; Yuichi Nanbu, all of Shiga, Japan

[73] Assignee: Takata Corporation, Tokyo, Japan

[21] Appl. No.: 564,857

[22] Filed: Aug. 9, 1990

[30] Foreign Application Priority Data

Sep. 21, 1989 [JP] Japan .................................. 1-245578

[51] Int. Cl.⁵ ............................................. B60R 21/10
[52] U.S. Cl. .................................... 280/732; 280/743
[58] Field of Search ................. 280/728, 731, 732, 743

[56] References Cited

U.S. PATENT DOCUMENTS 4,842,299 6/1989 Okamura et al. .................... 280/732
4,842,300 6/1989 Ziomek et al. ....................... 280/732
4,925,209 5/1990 Sakurai ................................. 280/732

Primary Examiner—Kenneth R. Rice
Attorney, Agent, or Firm—Kanesaka and Takeuchi

[57] ABSTRACT

An automotive air bag system has an air bag and inflators for inflating the bag. The bag and the inflators are held in a holder. A modular cover surrounding the bag engages the holder via clearance such that the cover is held by the holder so as to be movable for a given distance toward and/or away from the passenger.

8 Claims, 10 Drawing Sheets

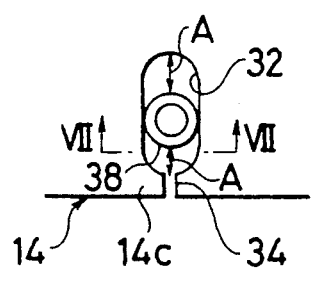
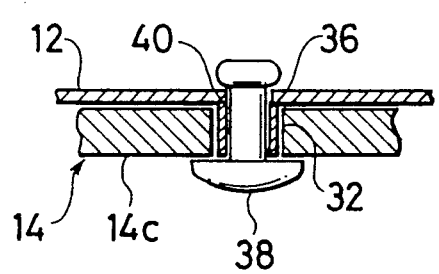
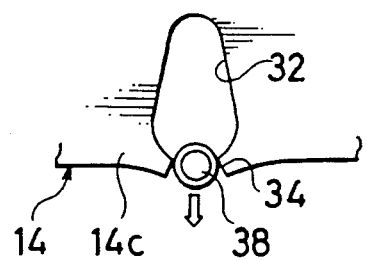
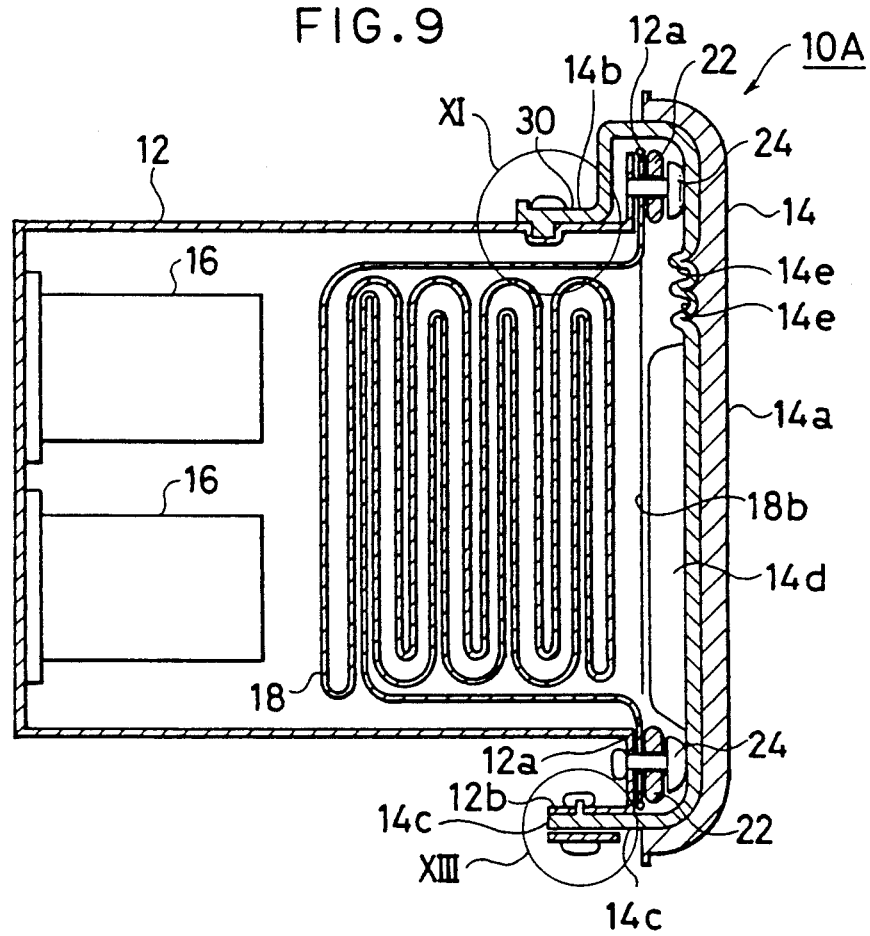

AIR BAG SYSTEM

FIELD OF THE INVENTION AND RELATED ART STATEMENT

The present invention relates to an air bag system which is installed in a vehicle and comprises a bag that inflates automatically in an accident to protect the passenger.

An air bag system of this kind has a holder, e.g., a container, in which an air bag and inflators are mounted. A modular cover is mounted so as to cover the bag. In case of an accident, the inflators actuate to inflate the bag. The inflating bag pushes the modular cover, which then begins to open in front of the passenger. The bag inflates greatly in front of the passenger to protect him or her.

This modular cover has tear lines or bending lines. When the inflators operate, the air bag pushes the modular cover which then tears or bends along the tear lines or bending lines and opens in front of the passenger.

In the conventional air bag system, the modular cover is relatively rigidly coupled to the holder such as a container to prevent the bag from moving if it is pushed with a force insufficient to inflate the bag. When the vehicle accelerates, the modular cover may be pushed toward the passenger by the air bag. When the passenger touches the cover, a load may be applied to it in the opposite direction. In the conventional air bag system, since the modular cover is comparatively rigidly coupled to the holder, if such external force is applied to the cover, stress concentrates in the vicinities of the tear lines or bending lines. If external force is repeatedly applied, the cover may become fatigued around the tear lines or bending lines.

OBJECT AND SUMMARY OF THE INVENTION

It is an object of the present invention to provide an air bag system which can reduce stress produced around the tear lines or bending lines in the modular cover to thereby reduce the fatigue in the vicinities of the lines, whereby improving the durability of the cover.

In one feature of the invention, clearance is formed between the modular cover and the holder that engages the cover to permit the cover to move a given distance toward or away from the passenger. When an external force is applied to the cover, the clearance enables it to move away from the passenger. As a result, the stress produced around the tear lines or bending lines is reduced.

BRIEF DESCRIPTION OF THE DRAWINGS

FIG. 6 is a view taken along the arrow VI of FIG. 2;

FIG. 7 is a cross-sectional view taken on line VII—VII of FIG. 6;

FIG. 8 is a diagram showing the manner in which the rivet shown in FIGS. 6 and 7 is brought into and out of fitting engagement with a slot;

FIG. 9 is a cross-sectional view of another air bag system according to the invention;

DESCRIPTION OF THE PREFERRED EMBODIMENTS

Figure 1A:
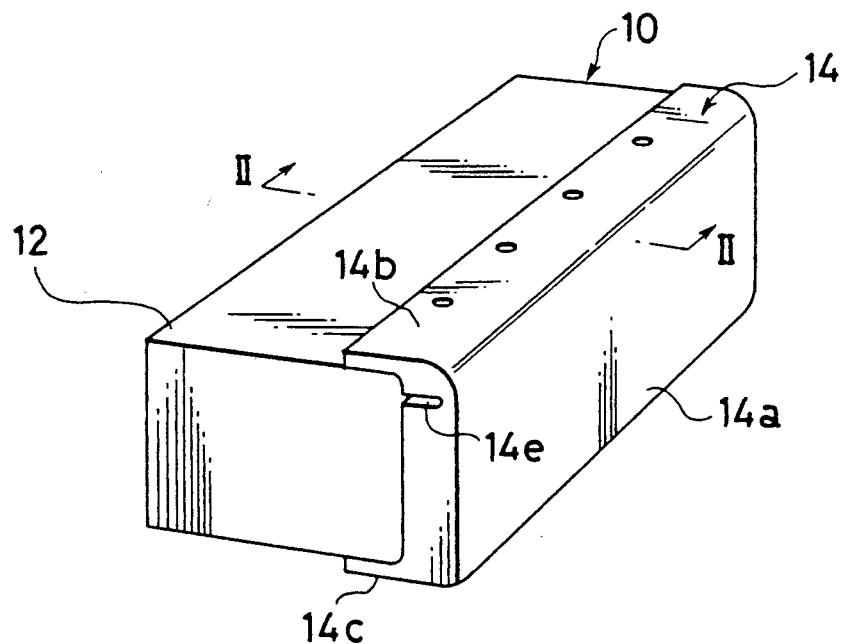
FIG. 1A is a perspective view of an air bag system according to the present invention.

Referring to FIGS. 1A, 1B, 2, 3, 4, 5, 6, 7, and 8, there is shown an air bag system embodying the concept of the present invention. This air bag system, generally indicated by numeral 10, comprises a container 12, a modular cover 14 mounted in front of the cover 14, inflators 16 installed inside the container 12, and an air bag 18 to be inflated by the inflators 16. The container 12 constitutes a holder.

Figure 3:
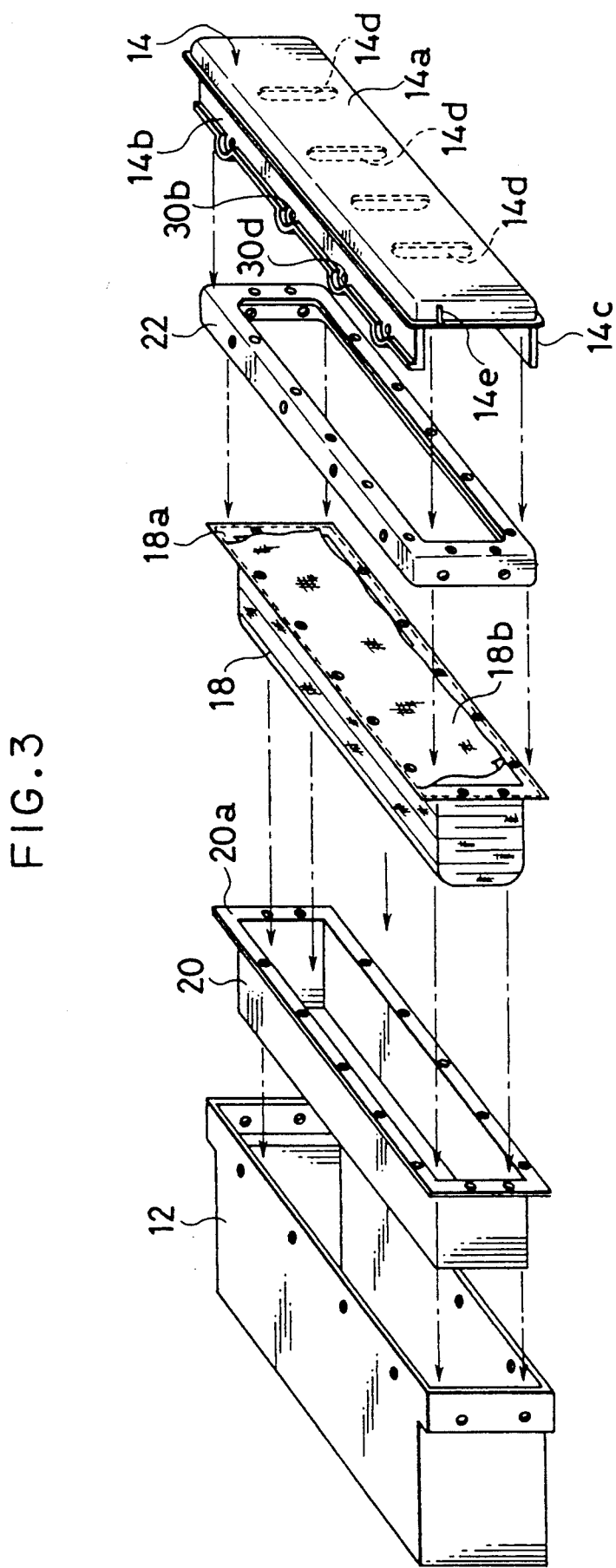
FIG. 3 is an exploded perspective view of the air bag system shown in FIG. 1A.

In this example, a casing 20 is inserted in the container 12, and the air bag 18 is inserted in the casing 20, as shown in FIG. 3. The rear surface of the casing 20 is provided with openings 21 to permit gas discharged from the inflators 16 to enter the container 20. The container 12 takes a boxlike form. A frame 22 of an L-shaped cross section is mounted to the inner fringe of the front surface of the container 12. The casing 20 has a flange 20a. Similarly, the air bag 18 has a flange 18a. These flanges 18a and 20a are mounted to the rear surface of the frame 22 with rivets 24. A piece of cloth 18b is stuck to the front fringe of the bag 18 to mask the front side of the bag.

The modular cover 14 comprises a body 14a, an upper flange 14b extending rearwardly from the top of the body 14a, and a lower flange 14c extending rearwardly from the bottom of the body 14a. This body 14a has a size to cover the front side of the container 12 that is open. A rib 14d is formed on the rear surface of the body 14a. The body 14a is formed with grooves 14e close to its rear surface to facilitate expanding the body 14a.

Figure 4:
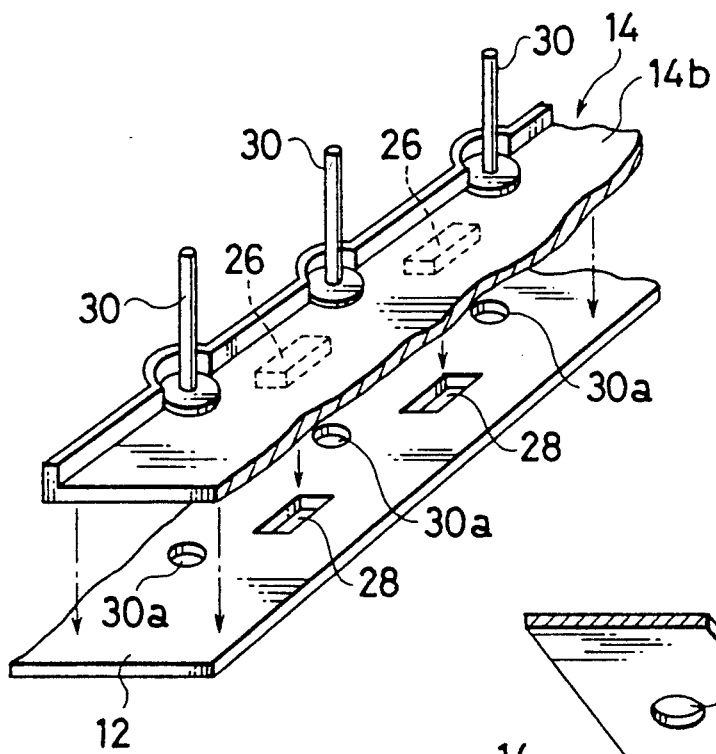
FIG. 4 is an exploded perspective view of a main portion of the air bag system shown in FIG. 1A.

As shown in FIG. 4, protrusions 26 are formed on the lower surface of the upper flange 14b. The upper surface of the container 12 is provided with openings 28 in which the protrusions 26 fit. The upper flange 14b is joined to the container 12 with rivets 30 after the protrusions 26 and the openings 28 are formed. The rivets 30 also acts to join the frame 22 to the upper surface of the container 12. The container 12 has holes 30a accommodating the rivets 30. Likewise, the modular cover 14 has holes 30b accommodating the rivets 30.

In this example, the modular cover 14 consists of a front layer located on the side of the passenger and a rear layer. The rear layer has an extension portion in which the holes 30b accommodating the rivets and slots 32 (described below) are formed.

Figure 5:
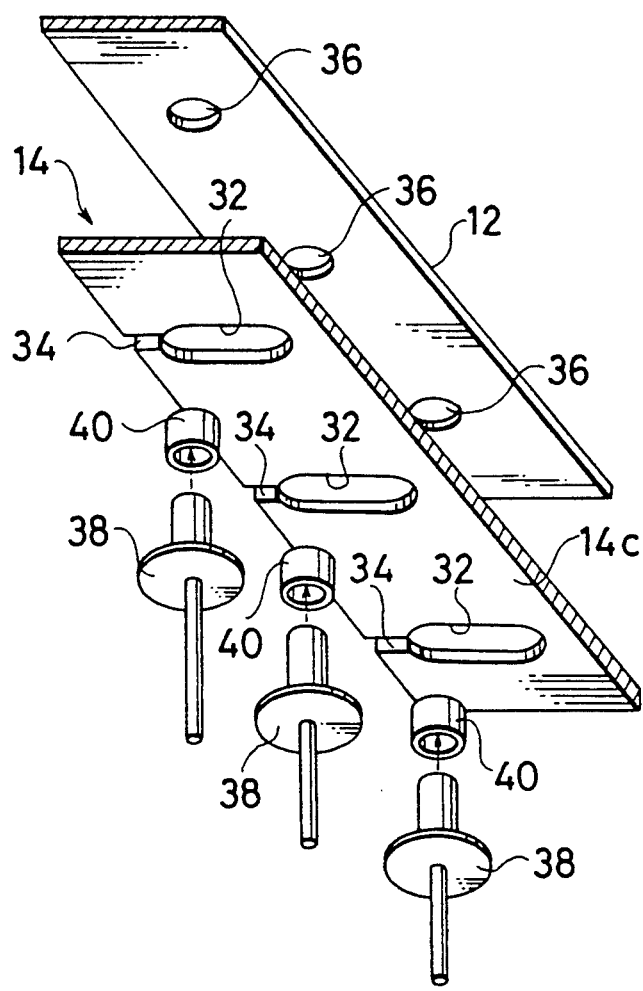
FIG. 5 is an exploded perspective view of another main portion of the air bag system shown in FIG. 1A.
Figure 10:
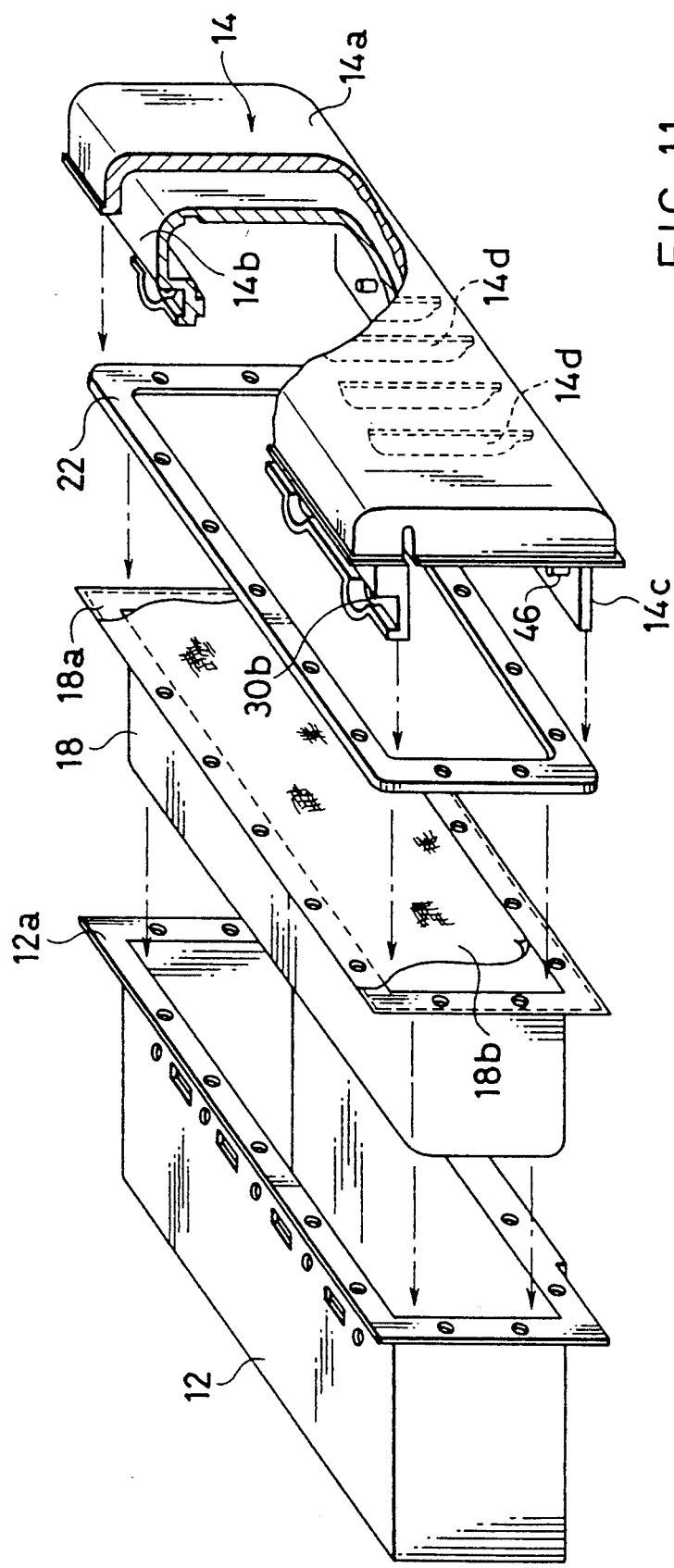
FIG. 10 is an exploded perspective view of the air bag system shown in FIG. 9.
Figure 11:
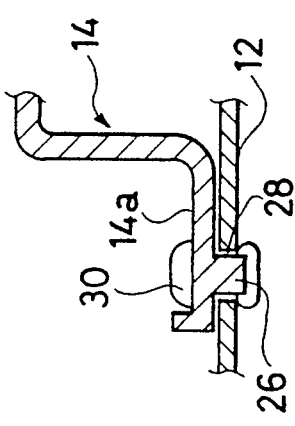
FIG. 11 is an enlarged view of a portion XI shown in FIG. 9.

As shown in FIGS. 5, 6, and 7, the lower flange 14c is provided with the slots 32 extending toward the passenger in front of which the modular cover 14 opens. A slit 34 extends from one end of each slot 32 to one fringe of the lower flange 14c. The bottom surface of the container 12 is provided with openings 36. Rivets 38 are inserted through the slots 32 and the openings 36 to join the lower flange 14c to the container 12. A collar 40 is fitted over each rivet 38. The outside diameter of the collar 40 is larger than the width of each slit 34.

Figure 1B:
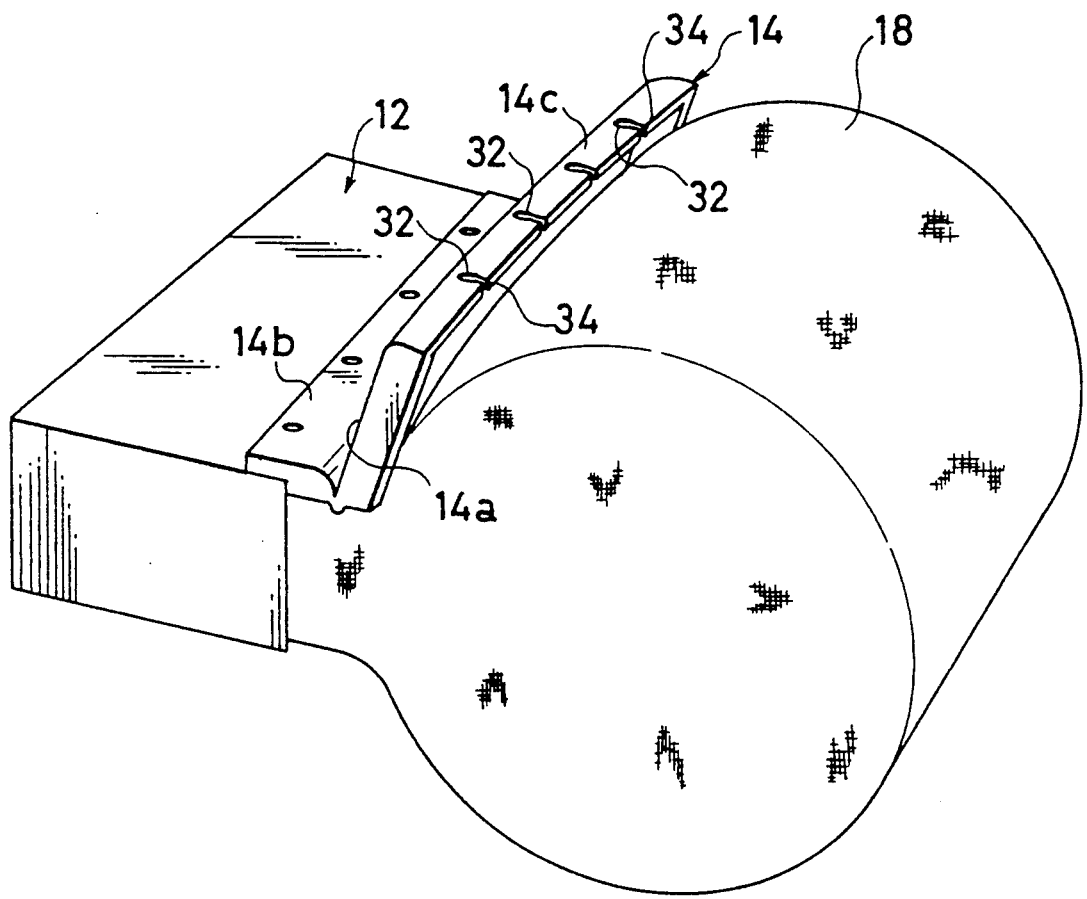
FIG. 1B is a view similar to FIG. 1A, in which the bag has been inflated.
Figure 2:
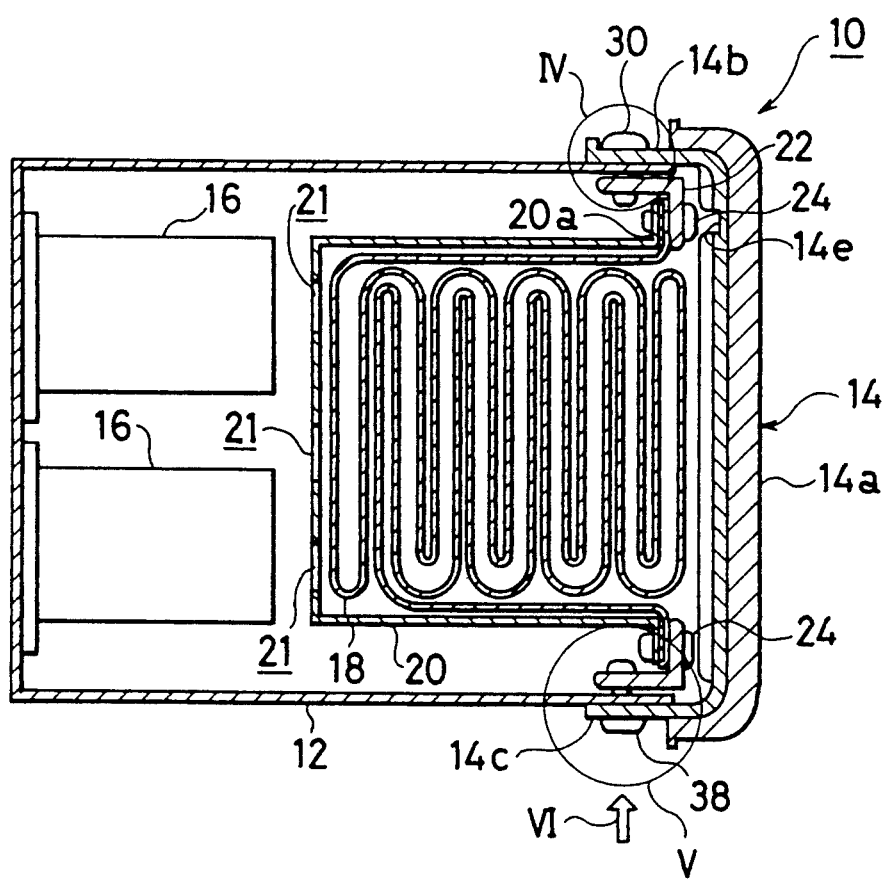
FIG. 2 is a cross-sectional view taken on line II—II of FIG. 1.

In the operation of the air bag system 10 constructed described thus far, when the inflators 16 actuate, the air bag 18 is inflated to push the modular cover 14 to force the rivets 38 and the collars 40 through their respective slits 34, as shown in FIG. 8. Thus, the lower half of the modular cover 14 moves forward. The cover 14 further undergoes the inflating force of the bag 18, so that the cover bends along the grooves 14e to open forwardly. As shown in FIG. 1B, the air bag 18 inflates into the passenger's compartment to protect the passenger.

In the present example, the slots 32 are formed in the lower flange 14c. A clearance A (FIG. 6) exists between the engaging portion of the lower flange 14c and the engaging portion of the container 12. In particular, the lower half of the modular cover 14 can move back and forth in the opening direction of the cover 14 as long as the rivets 38 move inside their respective slots 32. Accordingly, if the air bag 18 bears against the rear side of the cover 14, if the cover 14 is pushed by the bag 18 during acceleration of the vehicle, or if the bag 18 expands with heat and pushes the cover 14, then the lower half of the cover 14 shifts toward the passenger to prevent concentration of stress in the vicinities of the grooves 14e. If the passenger pushes the cover 14, the lower half of the cover 14 is moved into the container 12. Again, concentration of stress in the vicinities of the grooves 14e is prevented. Consequently, the cover 14 is kept from becoming fatigued around the grooves 14e.

In the above description, the lower half of the modular cover 14 is so designed that it can move either toward the passenger or toward the container 12. When each rivet 38 is at one longitudinal end of the corresponding slot 32, the cover moves in such a direction that the rivets move only toward the other longitudinal ends. Also in this case, the cover gets less fatigued around the grooves 14e than conventional structure.

Referring next to FIGS. 9-16, there is shown another air bag system according to the invention. This system, generally indicated by numeral 10A, is similar to the air bag system already described in conjunction with FIGS. 1A-8 except for the following. The container 12 and the air bag 18 have flanges 12a and 18a, respectively. The flange 18a of the bag 18 is mounted to the flange 12a of the container 12 via the frame 22 with rivets 24.

Figure 12:
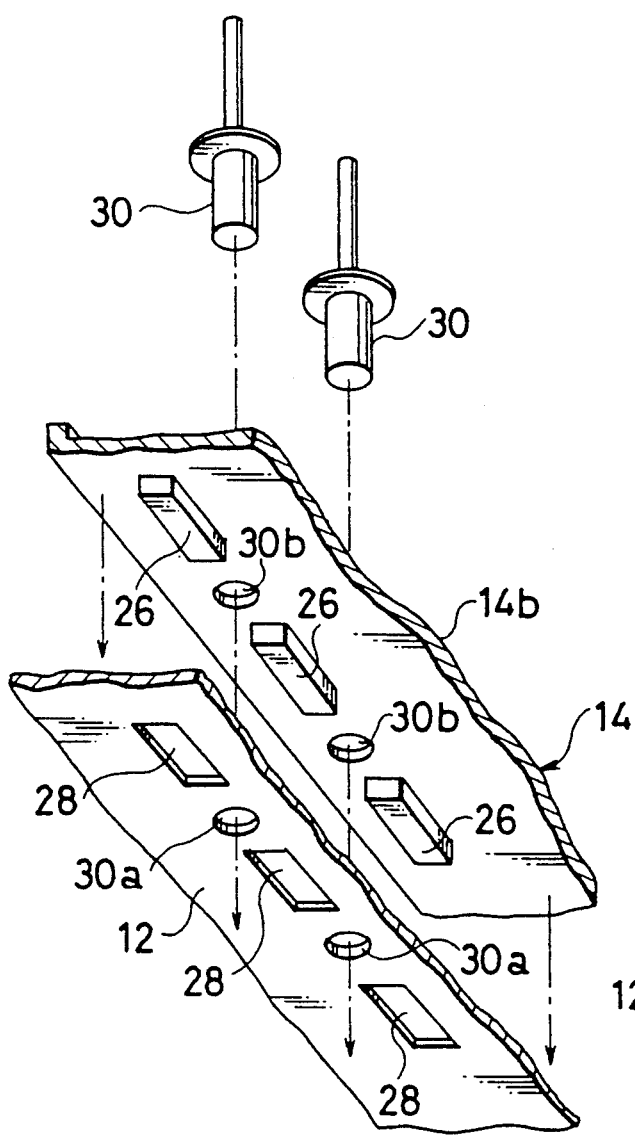
FIG. 12 is an exploded perspective view of the portion shown in FIG. 11.
Figure 13:
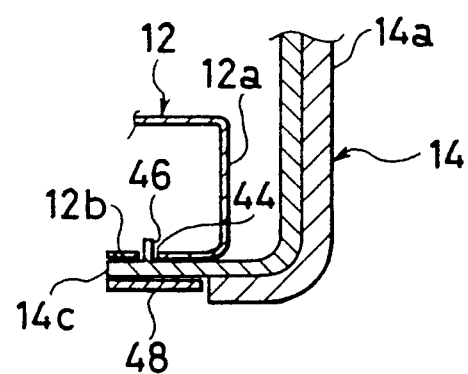
FIG. 13 is an enlarged view of a portion XIII shown in FIG. 9.

The upper flange 14b of the modular cover 14 is so shaped that it extends around the flange 12a of the container 12. The upper flange 14b of the cover 14 is fixed to the container 12 with rivets 30. Also in this example, protrusions 23 are formed on the upper flange 14b and fit in the openings 28 formed in the container 12, as shown in FIG. 12.

The flange 12a of the container 12 has a rearwardly bent flange portion 12b near its lower end. The lower flange 14c of the cover 14 and the flange portion 12b are laid to overlap each other. The flange portion 12b has slots 44 extending in the direction in which the modular cover 14 expands. Pins 46 engaging their respective slots 44 extend upright from the lower flange 14c. The lower flange 14c is supported from below by a plate 48.

Figure 14:
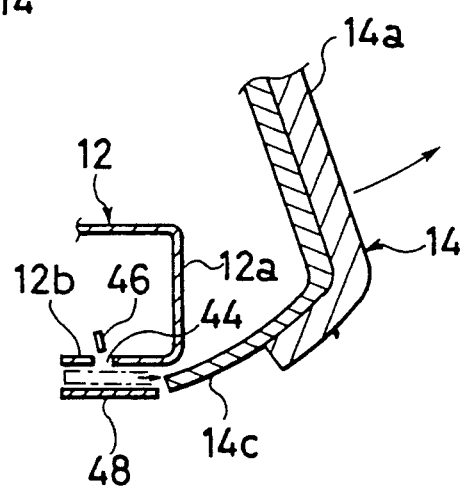
FIG. 14 is a view similar to FIG. 13, but showing a different condition.
Figure 15:
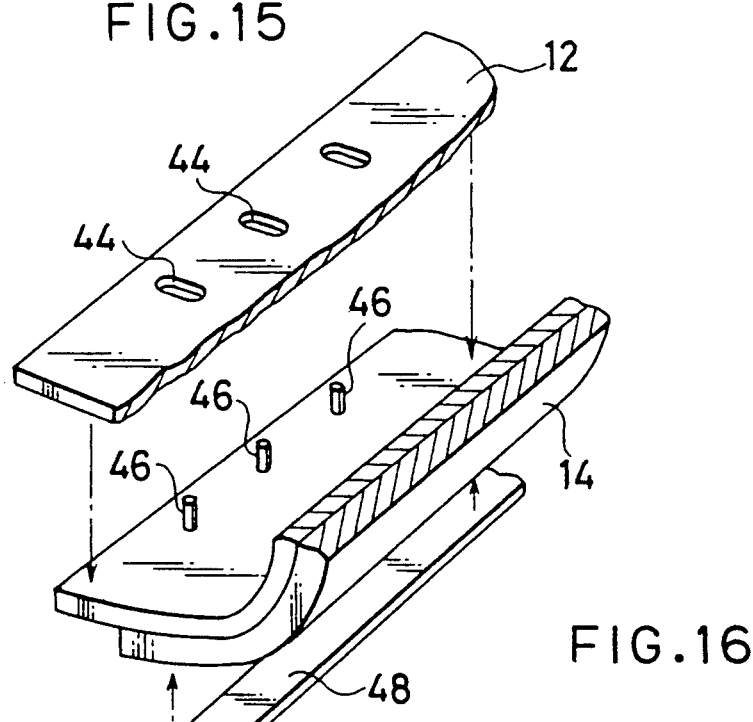
FIG. 15 is an exploded perspective view of the portion shown in FIGS. 13 and 14.

In the operation of the air bag system 10A constructed as described above, when the inflators 16 actuate to inflate the air bag 18, the pins 46 break as shown in FIG. 14, and the lower half of the modular cover 14 is urged toward the passenger. As the bag 18 unfolds, the cover 14 is bent along the grooves 14e. As a result, the bag 18 swells fully toward the passenger to protect him or her.

When the modular cover 14 engages with the container 12, the pins 46 are engaged in the slots 44. Thus, the lower half of the cover 14 is connected with the container 12. A clearance extends longitudinally of each slot 44 to enable the pins 46 to move. When an external force acting in the direction to open the cover 14 or in the opposite direction is applied to the cover 14, the lower half of the cover 14 moves back and forth, as long as the pins 46 move within their respective slots 44. Therefore, if any external force is applied to the cover 14, less stress is produced around the grooves 14e. Hence, the cover becomes less fatigued around the grooves 14e.

Figure 16:
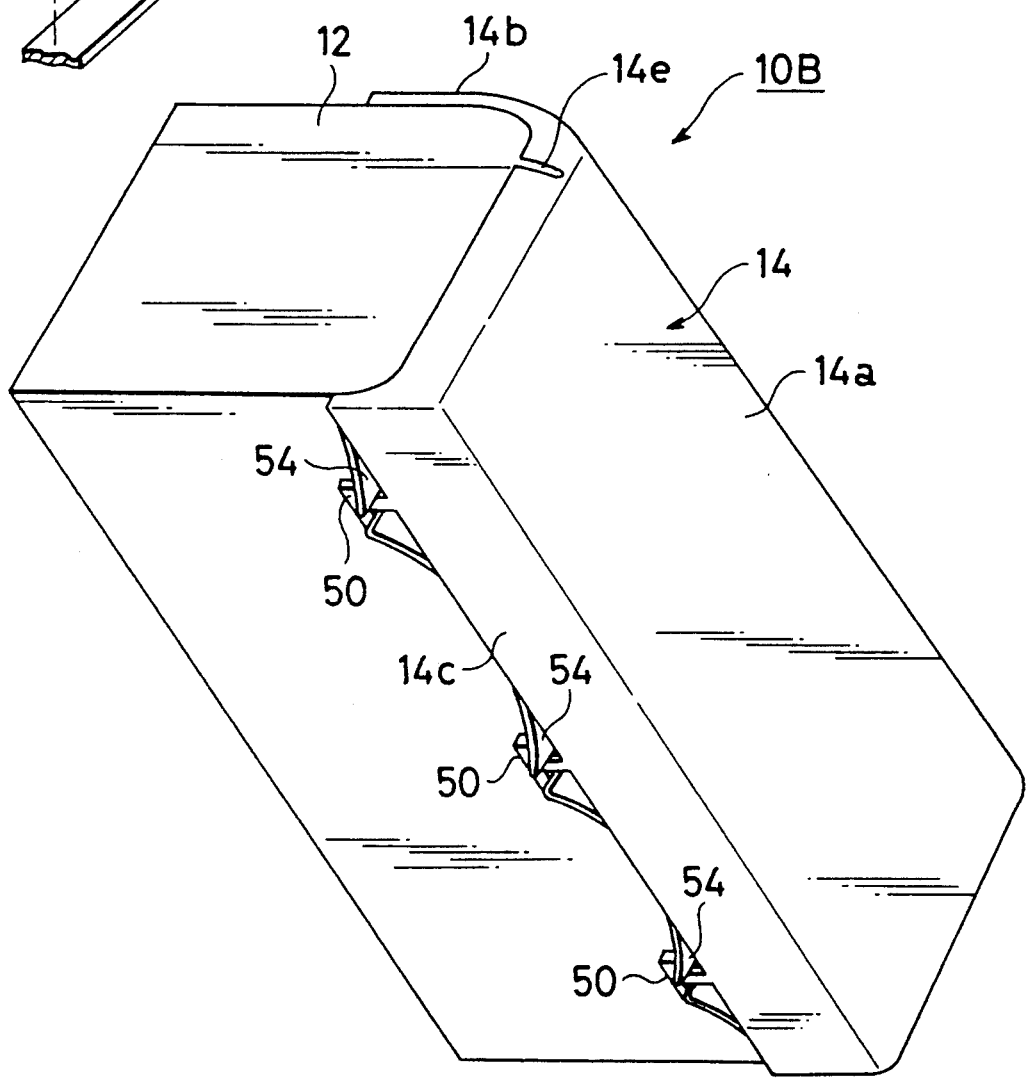
FIG. 16 is a perspective view of a further air bag system according to the invention.
Figure 17:
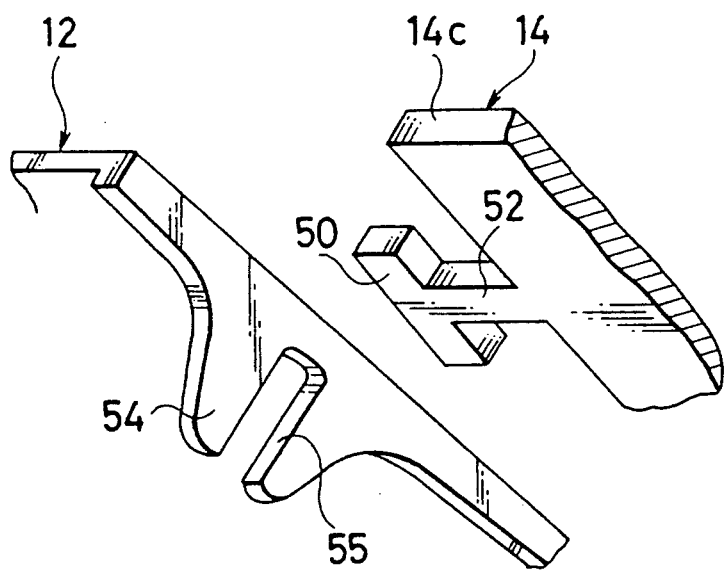
FIG. 17 is an enlarged view of a main portion of the air bag system shown in FIG. 16.
Figure 18:
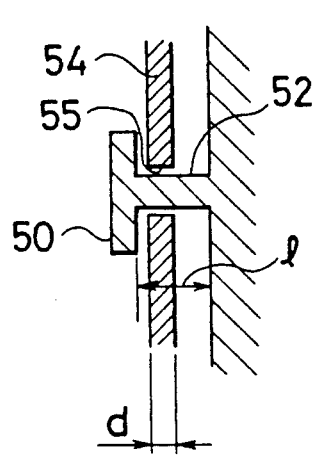
FIGS. 18 and 19 are cross-sectional views of the portion shown in FIG. 17, for showing different conditions.
Figure 19:
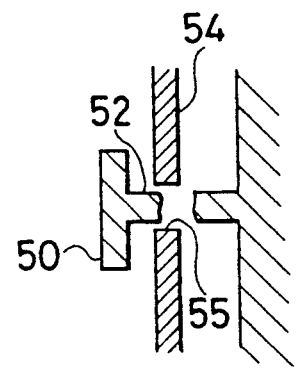

Referring to FIGS. 16 and 17, there is shown a further air bag system according to the invention. This system, generally indicated by numeral 10B, is similar to the air bag system already described in connection with FIGS. 1A-8 except for the following. T-shaped protrusions 50 are formed at the front end of the lower flange 14c of the modular cover 14. Each T-shaped protrusion 50 has a neck portion 52. The container 12 has pairs of grip portions 54 which hold their respective neck portions 52 between them. Each pair of grip portions 54 forms a slit 55. The neck portion 52 is engaged in the slit 55 to bring the lower end of the cover 14 into engagement with the container 12. As shown in FIG. 18, the length l of the neck portion 52 is made larger than the thickness d of the grip portion 54 to form clearance having a length of l-d. When an external force acts on the cover 14, the clearance permit the lower half of the cover 14 to move back and forth. Hence, less stress is produced around the grooves 14e, and the cover gets less fatigued around the grooves 14e. When the inflators actuate to inflate the air bag, the neck portions 52 break, as shown in FIG. 19, and the modular cover 14 opens in front of the passenger.

In this example, the protrusions 50 take a T-shaped form. They can also assume an L-shaped form or other form.

In any of the three examples described above, the modular cover 14 is designed to bend along the grooves 14e. The present invention can also be applied to the structure shown in FIG. 20, where the modular cover tears and opens in front of the passenger when the air bag is inflated.

Figure 20:
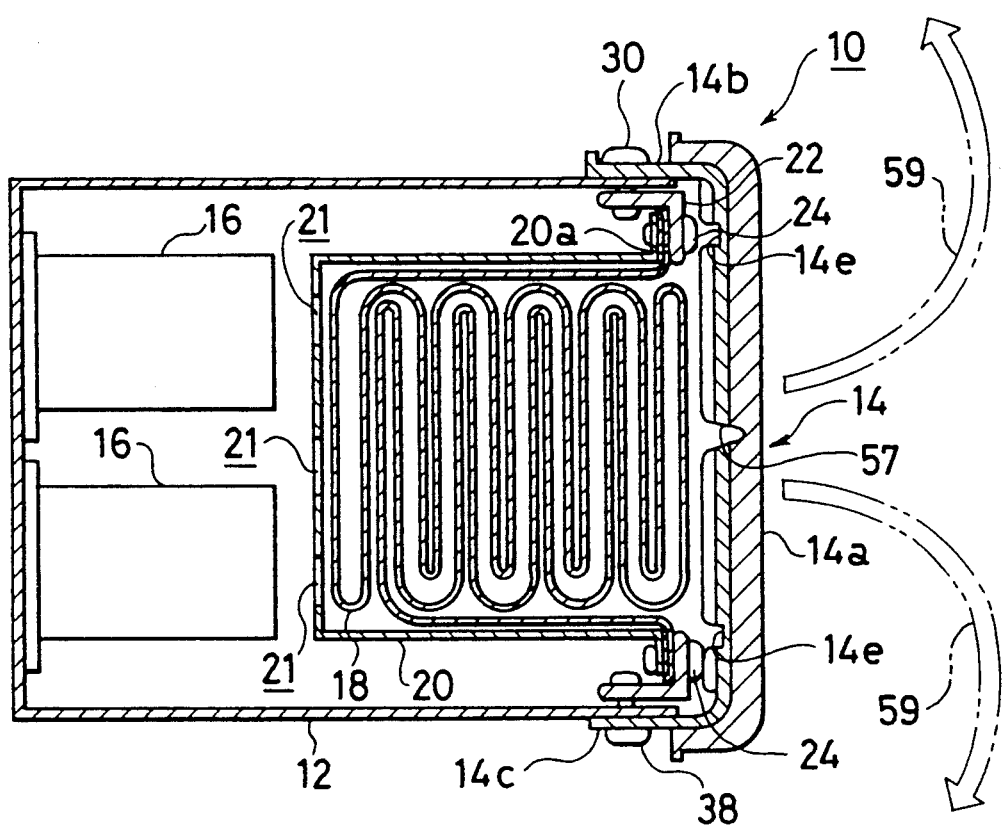
FIG. 20 is a cross-sectional view of a yet other air bag system according to the invention.

Referring to FIG. 20, there is shown a yet other air bag system according to the invention. This system, generally indicated by numeral 10, is similar to the air bag system shown in FIG. 2 except for the following. The modular cover 14 has a tear line 57 extending horizontally in the center of the cover 14. This cover 14 has grooves 14e one of which runs along the upper surface, the other extending along the lower surface of the cover 14. When the air bag 18 is inflated by the inflators 16 and pushes the cover 14 forward, the cover 14 tears along the tear line 57 and unfolds as indicated by the phantom lines and the arrows 59. In this example, the slits 34 shown in FIGS. 5, 6, and 8 are not formed in the cover 14. The lower half of the cover 14 is bent as indicated by the lower arrow 59 while held by the container 12, in the same way as the upper half. Also in this example, the lower half of the cover 14 can slightly move toward and away from the passenger, thus avoiding concentration of stress in the vicinities of the grooves 14e and the tear line 57. As a result, the cover is prevented from becoming fatigued around the grooves 14e and the tear line 57.

What is claimed is:

1. An air bag system for use in a vehicle, comprising:
a holder having an opening at one side thereof,
an air bag folded and retained in the holder,
inflating means attached to the holder and operating to provide gas for inflating the air bag in front of a passenger,
a modular cover for covering the opening of the holder, said modular cover including a first side having a first flange and a second side located opposite to the first side and having a second flange with a fringe, said first and second flanges extending rearwardly and overlapping the holder, said modular cover, when the air bag inflates, opening in front of the passenger,
first mounting means for locking and mounting the first flange of the modular cover to the holder, and
second mounting means for holding and mounting the second flange of the modular cover to the holder such that the second side can move for a predetermined distance in directions toward and away from the passenger, said second mounting means including holes formed in the second flange, slits formed in the second flange, each slit extending from the fringe to each hole at the opposite side of the passenger, and protruding members having rear ends, each rear end of the protruding members being fixed to the holder, each protruding member being loosely located in each hole and having a thickness larger than a width of each slit.

2. The air bag system of claim 1, wherein said holes are slots extending toward the passenger.

3. The air bag system of claim 1, wherein said protruding members are rivets.

4. The air bag system of claim 3, wherein collars are

5. The air bag system of claim 1, wherein the modular cover is provided with grooves to permit the cover to bend when the air bag is being inflated by the inflators and pushes the cover.

6. An air bag system for use in a vehicle, comprising:
a holder having an opening at one side thereof,
an air bag folded and retained in the holder,
inflating means attached to the holder and operating to provide gas for inflating the air bag in front of a passenger,
a modular cover for covering the opening of the holder, said modular cover including a first side having a first flange and a second side located opposite to the first side and having a second flange, said first and second flanges extending rearwardly and overlapping the holder, said modular cover, when the air bag inflates, opening in front of the passenger,
first mounting means for locking and mounting the first flange of the modular cover to the holder, and
second mounting means for holding and mounting the second flange of the modular cover to the holder such that the second side can move for a predetermined distance in directions toward and away from the passenger, said second mounting means including holes formed in a portion of the holder overlapping the second flange, and protrusions extending from the second flange and loosely disposed in the holes so that when the air bag is inflated by the inflating means and pushes the modular cover toward the passenger, the protrusions break.

7. The air bag system of claim 6 wherein said holes are slots extending toward the passenger.

8. An air bag system for use in a vehicle, comprising:
a holder having an opening at one side thereof,
an air bag folded and retained in the holder,
inflating means attached to the holder and operating to provide gas for inflating the air bag in front of a passenger,
a modular cover for covering the opening of the holder, said modular cover including a first side having a first flange and a second side located opposite to the first side and having a second flange, said first and second flanges extending rearwardly and overlapping the holder, said modular cover, when the air bag inflates, opening in front of the passenger,
first mounting means for locking and mounting the first flange of the modular cover to the holder, and
second mounting means for holding and mounting the second flange of the modular cover to the holder such that the second side can move for a predetermined distance in directions toward and away from the passenger, said second mounting means including protrusions extending rearwardly from the second flange and having neck portions, and pairs of grip members formed on the holder and holding the neck portions therebetween, each neck portion being loosely held between the respective grip members to permit the second flange of the modular cover to move in the directions toward and away from the passengers so that when the air bag is inflated by the inflating means and pushes the cover toward the passenger, the neck portions break.

* * * * *

UNITED STATES PATENT AND TRADEMARK OFFICE
CERTIFICATE OF CORRECTION

PATENT NO. : 5,060,972

DATED : October 29, 1991

INVENTOR(S) : Takeshi Satoh et al

It is certified that error appears in the above-identified patent and that said Letters Patent is hereby corrected as shown below:

Column 5, line 53, after "are" add --fitted over those portions of the rivets which are inserted in the slots.--.

Signed and Sealed this

Third Day of May, 1994

Attest:

BRUCE LEHMAN

*Attesting Officer*          *Commissioner of Patents and Trademarks*